UNITED STATES PATENT OFFICE.

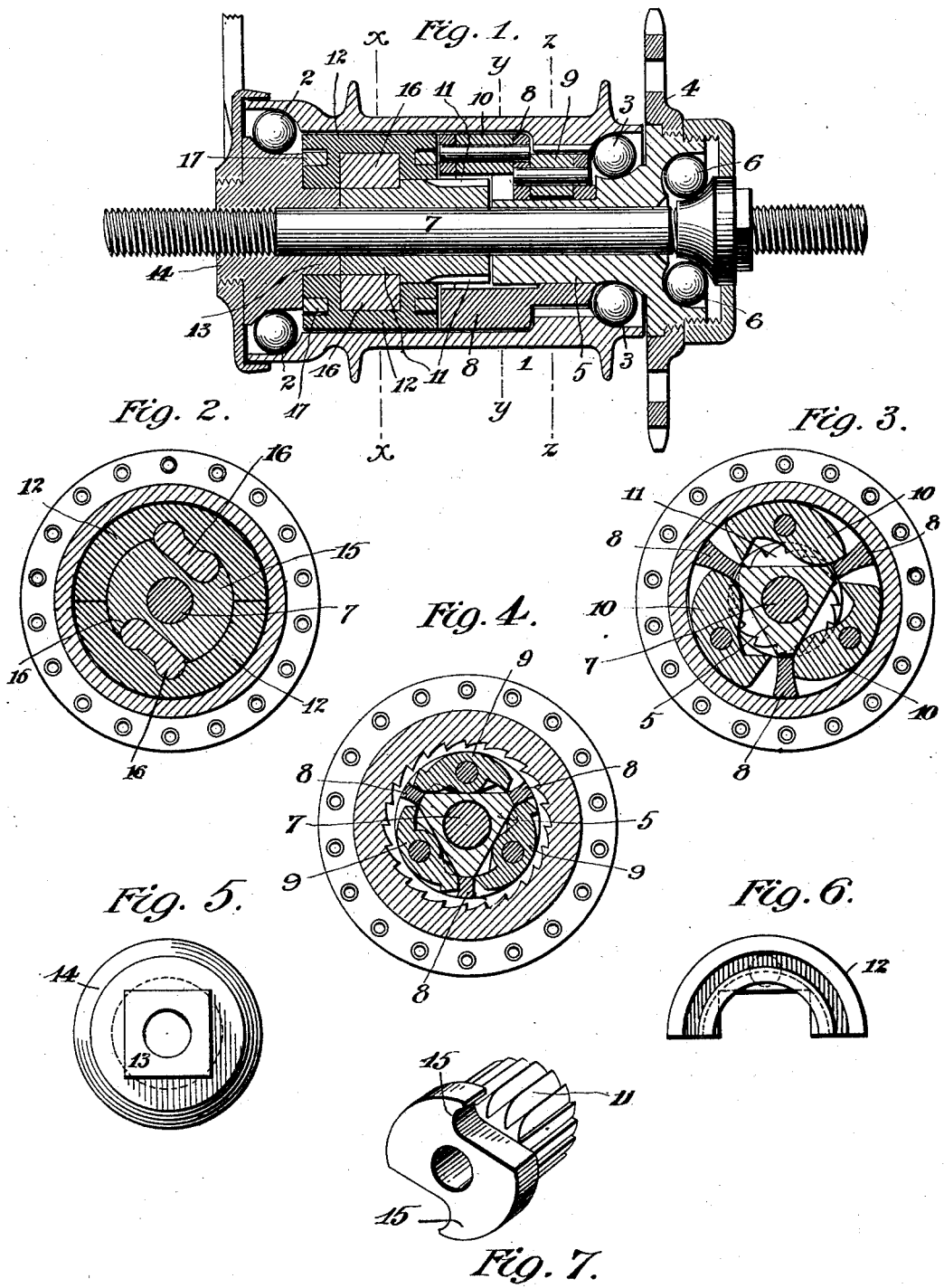

CHARLES GLOVER, OF NEW BRITAIN, CONNECTICUT, ASSIGNOR TO P. & F. CORBIN, OF NEW BRITAIN, CONNECTICUT, A CORPORATION OF CONNECTICUT.

COASTER-BRAKE.

SPECIFICATION forming part of Letters Patent No. 716,407, dated December 23, 1902.

Application filed October 9, 1901. Serial No. 78,074. (No model.)

*To all whom it may concern:*

Be it known that I, CHARLES GLOVER, a citizen of the United States, residing at New Britain, Hartford county, Connecticut, have invented certain new and useful Improvements in Coaster-Brakes, of which the following is a full, clear, and exact description.

My invention relates to coaster-brakes, and particularly to the brake mechanism thereof. The general features of construction by which the driver is connected or disconnected with either the hub or with the brake-actuator are shown and described specifically in my Patent No. 696,036, of March 25, 1902, and therefore need only be described generally herein. My said patent includes brake mechanism broadly, irrespective of its particular form or place of location.

The object of my present invention, however, is to improve the form of brake mechanism and locate it where it can be most advantageously used.

In the drawings, Figure 1 is a longitudinal sectional view through the hub of a wheel provided with my coaster-brake. Fig. 2 is a section on line X X, Fig. 1. Fig. 3 is a section on the line Y Y, Fig. 1. Fig. 4 is a section on the line Z Z, Fig. 1. Fig. 5, is an end view of a detail of construction. Fig. 6 is an end view of one of the brake-shoes. Fig. 7 is a perspective view of the brake-actuator.

1 is a hub mounted at each end upon suitable antifriction-bearings 2 3.

4 is a driver carrying a cam-like extension 5.

6 represents antifriction-bearings for the driver.

7 is a central shaft.

8 is a frame carrying pawls 9 and 10, so that they may alternately and respectively engage with the wheel-hub 1 or the brake-actuator 11, the positions of the pawls being such relatively to the hub and the driver extension or the brake-actuator and the driver extension that when either of said pawls are in operative engagement they serve to couple the driver extension with the hub or the brake-actuator, so that rotary motion of the driver 4 will be transmitted to one or the other of said parts. The frame 8 manifestly turns with the driver and driver extension 5; but said parts—to wit, the frame and the driver extension—have limited rotative movement relatively to each other, so that the said extension may operate one or the other sets of pawls.

Aside from certain slight variations in proportion the construction of the parts thus far described corresponds substantially to that specifically referred to in my former patent above cited.

The brake mechanism of the present case is located so that it will act inside of the hub and between the bearings rather than outside of the same. This permits of the manufacture of a much more compact form of hub and permits the application of the brake at a point where it will produce a more uniform and evenly-distributed strain. These and other advantages will be apparent to the mechanic skilled in the art from an examination of the drawings illustrative of the improved mechanism and a reading of the specification descriptive thereof.

12 12 are brake-shoes, two of which are by preference provided and are normally drawn toward each other by a suitable spring 17. These brake-shoes are preferably made of solid non-yielding material and substantially surround the brake-actuator. The central portion of the brake-shoes is squared, as shown in Fig. 6, so as to substantially fit a correspondingly-shaped extension 13 upon the bushing 14, carried by the axle 1 and stationary with respect thereto. This squared extension 13 serves as a guide to permit the brake-shoes to move in and out, but prevents independent rotative movement thereof. The brake-actuator 11 is provided with hooked extensions 15 15. Located between the said hooked extensions and the brake-shoes are levers 16 16. The lever 16 is engaged at one end by the hooked extension 15 on brake-actuator 11. The other end of said lever projects into a recess or notch in the inner side of the brake-shoe 12. It will now be seen that when the brake-actuator is rotated oppositely to the hands of a clock, when viewed as shown in Fig. 2, the levers 16 16 will cause the brake-shoes to be forced apart, and will consequently bring them tightly into engagement with the inside of the hub 1. The degree of frictional engagement may be varied, of course, by the position of the brake-actuator, which is determined by the degree of pressure applied through the driver.

Assume the device is used in connection with a bicycle in which the driver is in the form of a sprocket-wheel. The rider when he desires to propel the mechanism ahead rotates the pedals in the usual fashion, causing the driver 4 to turn clockwise. This rotation causes (through the hub extension) the hooks 9 to engage with the wheel-hub, thereby coupling the driver thereto, so that continued forward movement of the driver transmits forward movement to the wheel-hub. When the rider desires to coast, he ceases pedaling, whereupon the driver 4 ceases rotating. As the wheel-hub 1 continues to advance the pawls 9 are freed therefrom, so that the wheel is free to turn until the rider desires to check the same, whereupon he may reverse the direction of the driver 4, which action throws the pawls 10 into engagement with the brake-actuator. A further-continued rearward movement of the driver effected by backpedaling slightly rotates the brake-actuator, which through the toggle-levers 16 16 forces outwardly the brake-shoes 12 until they engage with the wheel-hub 1 to retard or entirely check the rotation of the wheel-hub, as desired.

Manifestly the particular construction may be modified in certain details without departing from the spirit or scope of my invention.

What I claim is—

1. In a coaster-brake, a hub, bearings therefor, a brake-shoe located between said bearings and within the hub, means for guiding said brake-shoe and confining its movements to radial reciprocation, a brake-actuator comprising a sleeve extending to the rear of said brake-shoe and means between said brake-shoe and brake-actuator whereby the rotary movement of the brake-actuator is converted into straight-line movement and applied to the brake-shoe.

2. In a coaster-brake, a hub, bearings therefor, a brake-shoe located between said bearings and within the hub, means for guiding said brake-shoe and confining its movement to radial reciprocation, a brake-actuator comprising a sleeve extending to the rear of said brake-shoe and toggle-levers between said brake-shoe and brake-actuator whereby the rotary movement of the brake-actuator is converted into straight-line movement and applied to the brake-shoe.

3. In a coaster-brake, a hub, bearings therefor, a pair of brake-shoes located within the hub and between said bearings, means for guiding each of said brake-shoes and confining their movements to radial reciprocation, a brake-actuator comprising a sleeve extending into the hub, and means between the brake-shoes and the brake-actuator, said means coacting with both the brake-actuator and said shoes whereby the rotary movement of the actuator is converted into straight-line movement and applied to both of said brake-shoes.

4. In a coaster-brake, a wheel-hub, bearings at the ends thereof, a brake-shoe located within said hub, and between said bearings, means for operating said brake-shoe, a driver, an extension therefrom projecting into said hub, oppositely-arranged pawls for engaging either the wheel-hub or said brake, said pawls being operated by said extension, a frame carrying said pawls, said driver and frame having limited rotative movement relatively to each other.

CHARLES GLOVER.

Witnesses:
L. VREELAND,
ROBT. S. ALLYN.